United States Patent
Saavedra (10) Patent No.: US 11,530,529 B2
(45) Date of Patent: Dec. 20, 2022

(54) HEAT TRANSFER SYSTEM UTILIZING DYNAMIC FLUID LEVELING

(71) Applicant: John Saavedra, Irmo, SC (US)

(72) Inventor: John Saavedra, Irmo, SC (US)

( * ) Notice: Subject to any disclaimer, the term of this patent is extended or adjusted under 35 U.S.C. 154(b) by 608 days.

(21) Appl. No.: 16/260,876

(22) Filed: Jan. 29, 2019

(65) Prior Publication Data

US 2020/0240654 A1 Jul. 30, 2020

(51) Int. Cl.
| | |
|---|---|
| E03B 3/28 | (2006.01) |
| F24F 5/00 | (2006.01) |
| F24T 10/15 | (2018.01) |
| F24S 20/40 | (2018.01) |
| F24V 50/00 | (2018.01) |

(52) U.S. Cl.
CPC .............. *E03B 3/28* (2013.01); *F24F 5/0046* (2013.01); *F24S 20/40* (2018.05); *F24T 10/15* (2018.05); *F24V 50/00* (2018.05)

(58) Field of Classification Search
None
See application file for complete search history.

(56) References Cited

U.S. PATENT DOCUMENTS

| | | | | |
|---|---|---|---|---|
| 3,951,204 A | * | 4/1976 | Movick | F28D 15/025 |
| | | | | 165/104.19 |
| 4,171,721 A | * | 10/1979 | Movick | F25B 23/006 |
| | | | | 165/45 |
| 4,246,890 A | * | 1/1981 | Kraus | F25B 23/006 |
| | | | | 126/636 |
| 4,366,853 A | * | 1/1983 | Bernier | F03G 7/00 |
| | | | | 165/104.22 |
| 4,552,208 A | * | 11/1985 | Sorensen | F24S 90/00 |
| | | | | 165/104.22 |
| 4,573,525 A | * | 3/1986 | Boyd | F24S 90/10 |
| | | | | 165/104.22 |
| 4,611,654 A | * | 9/1986 | Buchsel | F24D 11/003 |
| | | | | 126/636 |

(Continued)

FOREIGN PATENT DOCUMENTS

CN 100443823 C * 12/2008

OTHER PUBLICATIONS

Translation of CN100443823C, accessed Oct. 7, 2021 (Year: 2008).*

*Primary Examiner* — Christopher P Jones
*Assistant Examiner* — Phillip Y Shao
(74) *Attorney, Agent, or Firm* — Southeast IP Group; Thomas L. Moses (57) ABSTRACT

A heat transfer system includes a conduit having open first and second ends, first and second thermal exchange segments disposed in-between and in fluid communication with the ends, and a means for adding fluid to the first end. The first thermal exchange segment is disposed underneath and in thermal communication with the ground, a body of water, or other location with a different temperature. The first and second ends are arranged above all other section of conduit and relative to one another so that they are communicating vessels and a change in fluid level in one changes the fluid level in the other. The means for adding fluid to the first end of the conduit causes fluid to flow freely from the first end to the second end and fluid level to rise in the second overcoming any hydrostatic pressure in the system without a pump disposed along the conduit.

13 Claims, 10 Drawing Sheets

(56) References Cited

U.S. PATENT DOCUMENTS

| | | | |
|---|---|---|---|
| 6,481,232 B2 * | 11/2002 | Faqih | F24F 13/222 |
| | | | 62/285 |
| 6,574,979 B2 * | 6/2003 | Faqih | B01D 5/0033 |
| | | | 62/285 |
| 7,380,584 B2 * | 6/2008 | Ippoushi | F28D 15/0266 |
| | | | 165/104.24 |
| 7,798,140 B2 * | 9/2010 | van Houten | F24S 40/58 |
| | | | 126/635 |
| 9,541,309 B2 * | 1/2017 | Colwell | F24T 10/20 |
| 9,593,675 B2 * | 3/2017 | Lin | F04B 17/006 |
| 2009/0277444 A1 * | 11/2009 | Lin | F24H 9/124 |
| | | | 126/643 |
| 2011/0259321 A1 * | 10/2011 | Lin | F24D 11/004 |
| | | | 126/639 |

* cited by examiner

HEAT TRANSFER SYSTEM UTILIZING DYNAMIC FLUID LEVELING

BACKGROUND

The transfer of heat is both a necessary and critical mechanism within a broad range of systems and processes. In fact, modern society now relies on many systems and processes utilizing heat transfer and/or refrigeration for, among other things, climate control of our houses. Refrigeration and/or the transfer of heat in most systems and processes, however, is an energy-intensive exercise which can be costly, as it often involves the use of energy to generate heat or drive an electro-mechanical compressor.

In addition to being costly and requiring large amounts of energy, many systems and processes involving refrigeration and/or the transfer of heat are also bulky and complex with many different parts, stages, and underlying principles that can limit their usefulness. In fact, due to their complexity, it is common for such systems and processes to have dedicated and trained personnel to design, install, maintain, and repair them.

However, it is a common desire to limit energy consumption as energy can be costly. Many efforts have been made to limit energy consumption in heat transfer and/or refrigeration systems. These efforts commonly either replace the system with one of a more efficient design, supplement an existing system with another more efficient system to reduce the overall energy requirements, or replace/supplement the energy source with one that is renewable and less costly. However, these efforts commonly are as complex as the systems they are replacing or supplementing. Further, regarding renewable solar energy, the source is commonly of variable efficiency based on operating conditions. For example, solar panels are less efficient as they increase in temperature.

Lastly, it is uncommon that such systems are designed to also deal with humidity and/or the production of drinking water. However, removal of humidity, particularly in warmer areas, can provide decreased chances of mold growth. Additionally, the collection and treatment of moisture may also provide a potential source of drinking water.

Consequently, it would be advantageous to have a system which could replace or supplement existing heat transfer and/or refrigeration systems, which could provide more desirable conditions for the production of renewable energy, and even lower humidity and/or provide drinking water without being overly complex, bulky, requiring numerous dedicated and trained personnel, or significantly increasing costs.

BRIEF SUMMARY

The present invention comprises a system that, in one or more aspects, provides desired heat transfer, with lowered energy requirements and is comprised of fewer parts and stages than many conventional heat transfer systems. Also, the system of the present invention, in one or more aspects, can produce refrigeration. That is, cooling to a temperature lower than ambient. Indeed, this system utilizes a phenomenon first articulated by Aristotle in Ancient Greece. This phenomenon currently has no name, so the Applicant suggests "Dynamic Fluid Leveling" (DFL) to both name and describe it. It refers to the fact that the fluid in a continuous conduit open at both ends will settle to the same level at both ends. Thereby, if the fluid has a temperature gradient within the conduit, this process will move or transfer heat from one location to another. Also, the system of the present invention, in one or more aspects, is quiet, is of simple and inexpensive design, and costs little to manufacture, install, and maintain.

In certain aspects, the system provides heat transfer and/or refrigeration in a variety of circumstances with lowered energy requirements, costs, and complexity. In fact, the system—in certain embodiments—may be used to lower energy requirements and costs by providing cooling or heating in a variety of applications, such as warming or cooling attics, crawl spaces, swimming pools, and even solar panels. Further, the present system and its use may be used either in concert with or as a replacement to other heat transfer systems and methods, such as a heating, ventilation, and air conditioning (HVAC) system. Other advantages of one or more aspects will be apparent from the drawings and ensuing description.

In accordance with one embodiment, the system comprises a section of conduit having an open first and second end, both arranged so they are located above the other portions of the conduit and act as communicating vessels. That is, the ends are arranged so that a change in level of fluid in one end will cause a change in fluid level in another end. Further, the conduit also comprises two thermal exchange segments, one adjacent an item or area to be heated or cooled and one below ground, underwater, in shade, or some other location with a different temperature from the location of the first. Lastly, the system also includes a means for adding unpressurized fluid to one of the ends which, due to the ends being communicating vessels, displaces fluid throughout the conduit and thermal exchange segments without requiring a pump along the length of the conduit. In one embodiment, the means for adding fluid is a pump located between the two ends, but not along the conduit, which takes fluid from one open end and transports it to the other to cause the requisite displacement of fluid within the conduit. Unlike a pump along the conduit, a pump which only has to move fluid from one end to another does not have to have to work as hard and uses less energy, as it only has to move the fluid the short distance between the ends and has to deal with negligible fluid friction and hydrostatic pressure due to gravity.

In accordance with one aspect of operation, the heat transfer system embodiment described above can be utilized to cool an area, such as an attic. To this end, the system can be arranged so that the first and second ends, one thermal exchange segment, and a pump are all located in an attic while the other thermal exchange segment is located underground. Further, the first and second ends of the conduit can be placed at a roughly equal height above the ground and above the other portions of the conduit. Thereby, the first end and second end act as communicating vessels and fluid in the system will have the same height in both the first and second end. As the first and second ends act as communicating vessels, when fluid is removed from or added to one end, a lowering or rise of the fluid level in the other end occurs. Thereby, a pump may remove a volume of fluid from one of the ends and add it to the other causing the fluid to flow throughout the entire system. Specifically, the addition of fluid to the open end causes fluid to flow through the ground-based thermal exchange segment, giving off heat from an attic and then on to the attic-based thermal exchange segment to absorb more heat from the attic and eventually to be moved by the pump from one end to the other again to continue transit. Alternatively, it is foreseen that fluid may move in the opposite direction, through the attic-based thermal transfer segment first and then on into the ground based thermal exchange segment. In either case, the system may remove some of the heat which builds up in an attic and lessen the electrical load that a home HVAC will require, due to such heat.

A similar arrangement may also be utilized to absorb heat from an object, such as a solar panel, displacing fluid through a thermal exchange segment in thermal contact with the underside of a solar panel to increase that panel's efficiency by lowering the temperature thereof. However, in lieu of locating a thermal exchange segment underground or in a body of water, it is foreseen that a thermal exchange segment can be disposed in the shade generated by the solar panel itself. Therefore in one method of operation, fluid may be added to one open end, displacing fluid through a thermal exchange segment on the back of solar panel to absorb heat therefrom, into a shade-based thermal exchange segment to give off heat from the fluid and ultimately toward the other open end to be pumped again. In the alternative, the fluid may be moved in the opposite direction through the system, so it is displaced through the shade-based thermal exchange segment prior to the thermal exchange segment in contact with the solar panel.

In accordance with another aspect of operation, the heat transfer system described above can be utilized to warm an object, such as a pool. To this end, one thermal exchange segment can be placed in thermal contact with the water of a pool, while the other is located underground or on the roof of a house. As fluid is added to one end, fluid is displaced to flow through the ground-based or roof-based thermal exchange segment to absorb heat therefrom and into the pool-based thermal exchange segment to pass this heat to a pool before proceeding to the other open end. Thereby, a pool may be warmed with heat absorbed from the sun or the ground, providing a reduced load on any other heater, if utilized. It is also foreseen that the opposite flow may also be utilized. That is, fluid displaced through the conduit may first pass through the pool-based thermal exchange segment before the roof-based or ground-based thermal exchange segment. Also, a similar arrangement may also be utilized to move heat to a crawlspace in a house, displacing fluid through a thermal exchange segment in thermal contact with the underside of a house to help prevent the freezing of pipes.

In other embodiments, other means for adding fluid to one end may be utilized; one of the thermal exchange segments may be located underground, underwater, in shade, or some other location with a different temperature; the system may be variable to switch between various means for adding fluid to an end and various paths for the fluid; and the system may have additional parts which increase thermal transfer and/or assist flow of fluid within the system. For example, performance of the system may be improved by use of additional features with an embodiment, such as fins, spikes, dimples, light-reflective and light-absorbing paints or finishes, lenses, mirrors, or other common and well-known elements to improve thermal transfer efficiency.

DESCRIPTION OF THE DRAWINGS

These and other features, aspects, and advantages of the present invention will become better understood with regard to the following description, appended claims, and accompanying drawings where:

| REFERENCE NUMERALS | | | |
|---|---|---|---|
| 10 | System | 12 | Fluid |
| 14 | Conduit | 16 | First End |
| 18 | Second End | 20 | Reservoir |
| 22 | Outlet | 24 | Valve |
| 26 | First Thermal Exchange Segment | 28 | Second Thermal Exchange Segment |
| 30 | Heat Exchanger | 32 | Means for Adding Fluid |
| 34 | Pump | 36 | Inlet |

-continued

REFERENCE NUMERALS

| | | | |
|---|---|---|---|
| 38 | Valve | 40 | Ground |
| 42 | Water | 44 | Condensed Moisture Collector |
| 46 | Purification Mechanism | 48 | Condensation Plate |
| 50 | Shade | 52 | Solar Panel |

DETAILED DESCRIPTION OF THE INVENTION

Definitions

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

The term "fluid" is used herein to include liquids, mixtures, and solutions possibly including solid particles. Further, the term "condensation" is used herein within the usual scientific meaning of the word to mean the change of the physical state of matter from gas or vapor phase into liquid phase.

Heat Transfer System and Method of Use Generally

As shown in FIGS. 1-5 and 7-10, the present heat transfer system 10, in general, includes a fluid 12 filled conduit 14 having open first 16 and second 18 ends and two thermal exchange segments, a first 26 and second 28. The system 10 also includes a means 32 for adding fluid to one of those ends. In use generally, the first 16 and second 18 ends are located at an elevation above the other portions of the conduit 14 and arranged at similar heights to one another so that they act as communicating vessels and the addition of fluid 12 to one end displaces fluid 12 throughout the conduit 14 towards the other end, causing a rise in the fluid level of the other end.

Additionally, to facilitate the movement of heat, second thermal exchange segment 28 is located in thermal contact with a medium which is to be heated or cooled and the first thermal exchange segment 26 is located below the ground 40, under water 42, in shade 50, or in another location where it is in thermal contact with a medium of different temperature from that in thermal contact with the second thermal exchange segment 26. As fluid 12 flows through the conduit 14, it absorbs and gives off heat in the thermal exchange segments 26, 28, thereby heating or cooling the subject area in thermal contact with the second thermal exchange segment 28.

First Embodiment

In a first embodiment of the present system 10, the first thermal exchange segment 26 is disposed below ground 40 and the system 10 includes a pump 34 which transfers fluid between conduit ends 16, 18, as in FIGS. 1 and 2. Thereby, heat may be transferred from or to the ground 40, which maintains a more consistent temperature during the year though surface conditions change. As a result, the present system 10 could be utilized to heat or cool an object or area based on the time of year and/or desired function.

Cooling

Figure 1:
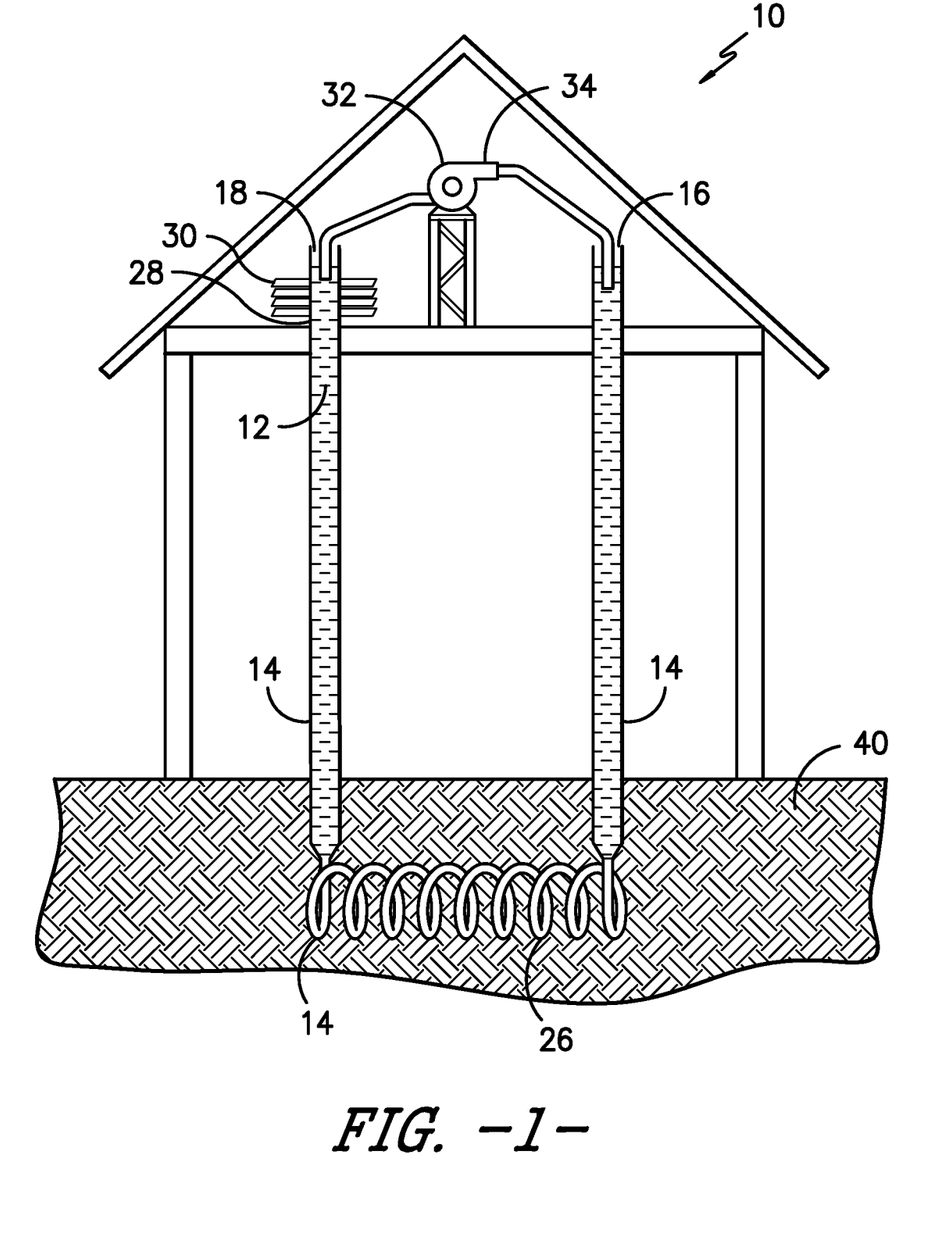
FIG. 1 is an elevation view of a cross section of one embodiment of a heat transfer system being used to remove heat from an attic having a conduit with open ends, having a first thermal exchange segment underground and a second thermal exchange segment with fins and pump in an attic.

For example, regarding cooling, the system 10 could be arranged as in FIG. 1 to provide cooling to an attic space. Therein, the first end 16, second end 18, second thermal exchange segment 28, and a pump 34 are in the attic and the first thermal exchange segment 26 is below ground 40. In operation, fluid 12 is taken from the second end 18 and pumped into the first end 16, displacing fluid through a portion of the conduit 14 into the first thermal exchange segment 26 below ground 40. Therein, heat from the attic absorbed in the fluid 12 is passed to the cooler ground 40. As the pump 34 continues to move fluid 12 into the first end 16, fluid in the first thermal exchange segment 26 moves through another portion of the conduit 14 and into the second thermal exchange segment 28. In the second thermal exchange segment 28, heat from the attic is absorbed into fluid 12 before fluid travels to the second end 18 to be pumped to the first end 16.

In an alternative operation, the pump 34 could instead move fluid 12 from the first end 16 into the second end 18 to displace fluid 12 through the second thermal exchange segment 28—where it absorbs attic heat—into the first thermal exchange segment 26—giving off the attic heat—and on up to the first end 16 again to be pumped. Further, a similar set up system 10 may be utilized to cool other areas or objects, such as a solar panel—as in FIG. 5.

Heating

Figure 2:
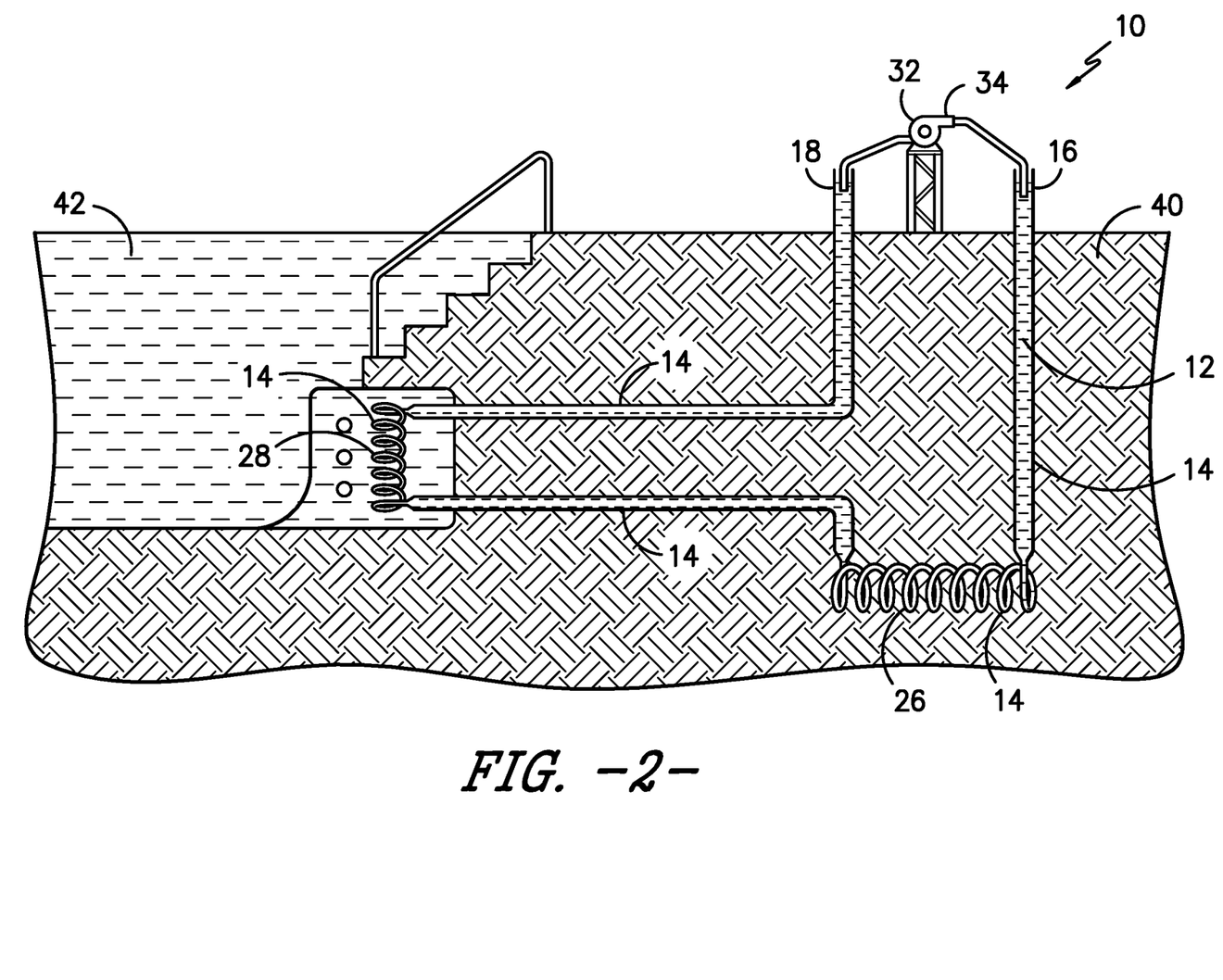
FIG. 2 is an elevation view of a cross section of one embodiment of a heat transfer system being used to add heat to a pool with the second thermal exchange segment in thermal communication with the water of a pool.
Figure 8:
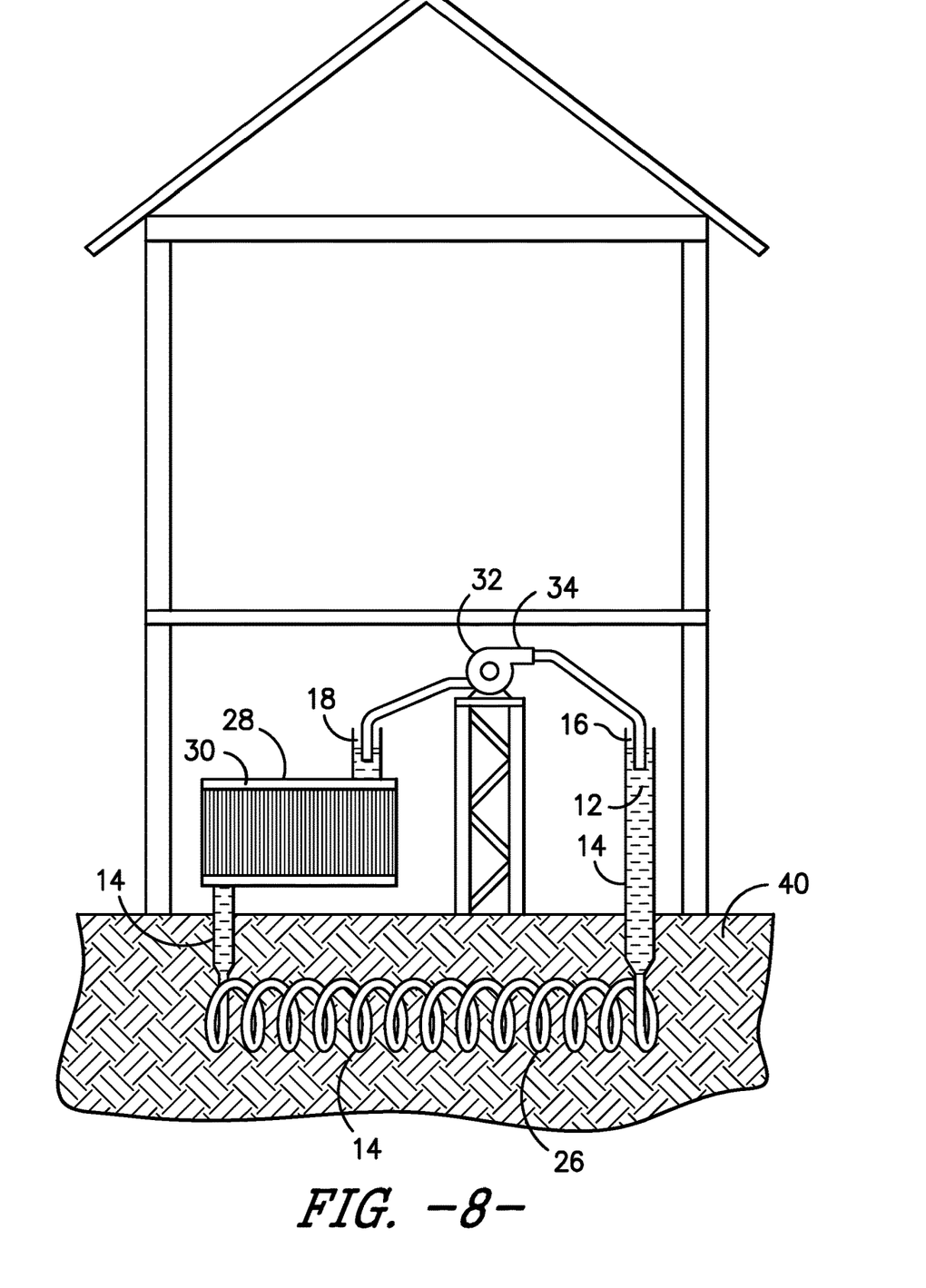
FIG. 8 is an elevation view of a cross section of one embodiment of a heat transfer system being used to heat a crawl space with a first thermal exchange segment disposed underground and second thermal exchange segment disposed within the crawl space.

As an example, regarding heating, the system 10 could be arranged as in FIGS. 2 and 8 to provide heat to a pool or a crawlspace, respectively, during winter-like conditions. The second thermal exchange segment 28 is in thermal contact with water in a pool in FIG. 2 and in thermal contact with air in a crawlspace under a house in FIG. 8. In operation, fluid 12 is taken from the second end 18 and pumped into the first end 16, displacing fluid 12 through a portion of the conduit 14 into the first thermal exchange segment 26 located underground to absorb heat from the ground 40. As the pump 34 continues to move fluid 12 into the first end 16, fluid in the first thermal exchange segment 26 is displaced through a portion of the conduit 14 and into the second thermal exchange segment 28 to give off the heat absorbed from the ground 40. Thereafter, fluid 12 is displaced to the second end 18 where it can then be pumped to the first end 16 again.

In an alternative operation, the pump 34 could instead move fluid 12 from the first end 16, which has already passed through the first thermal exchange segment 26 and absorbed heat from the ground 40, into the second end 18 to displace fluid 12 through the second thermal exchange segment 28, giving off heat therefrom and passing on to the first thermal exchange segment 26 and up to the first end 16 again.

Second Embodiment

Figure 3:
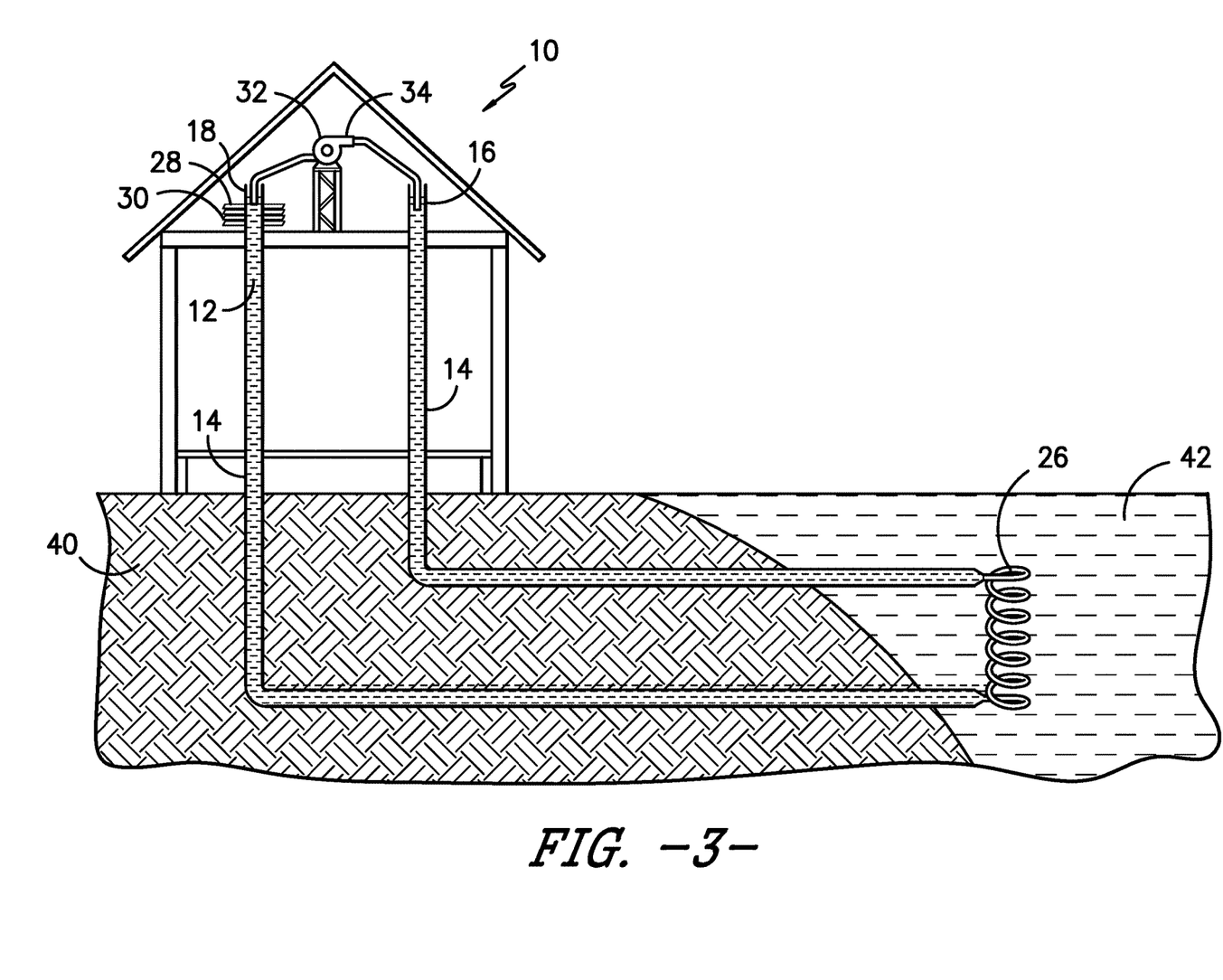
FIG. 3 is an elevation view of a cross section of one embodiment of a heat transfer system being used to remove heat from an attic having a first thermal exchange segment underwater, as opposed to underground.
Figure 9:
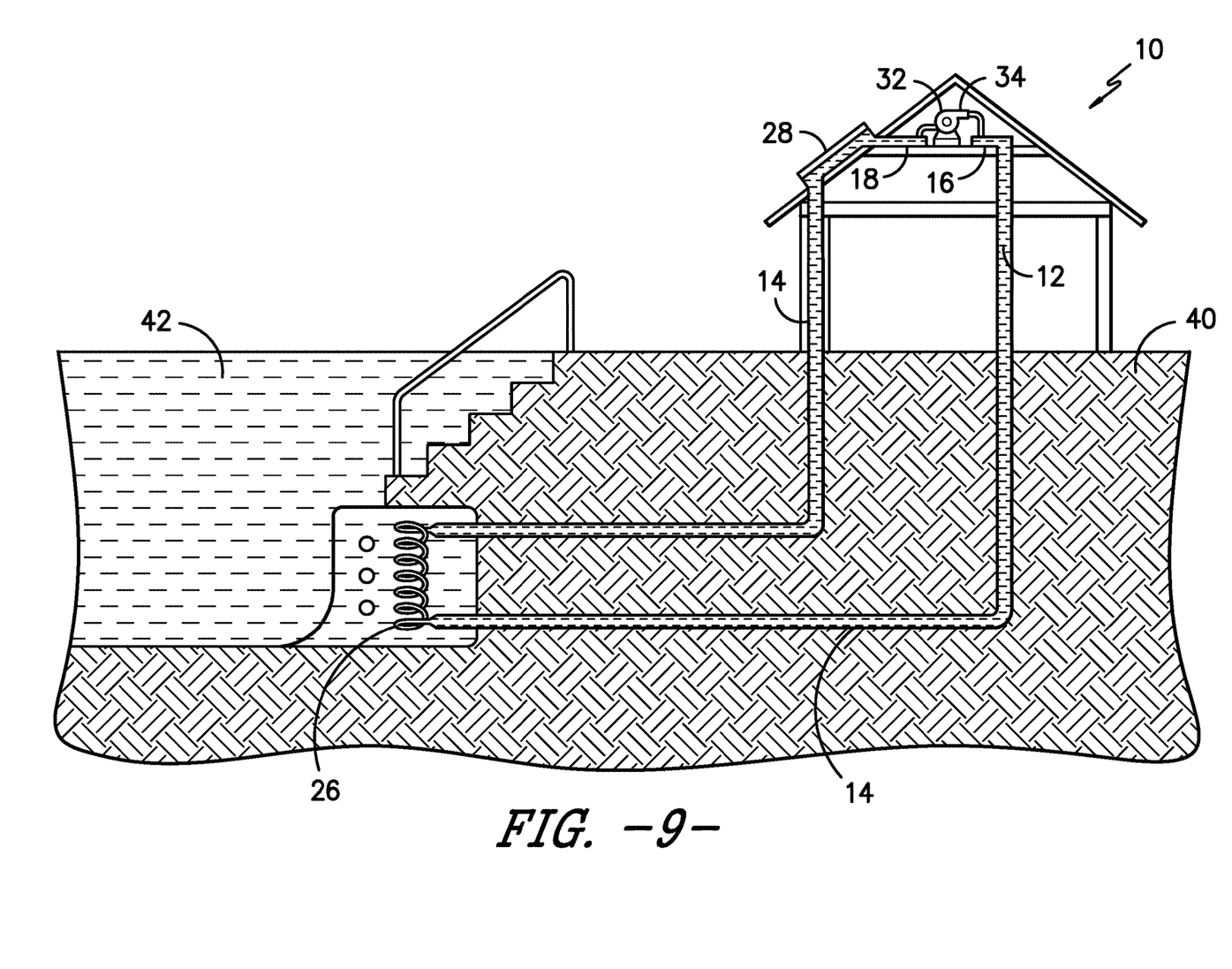
FIG. 9 is an elevation view of a cross section of one embodiment of a heat transfer system being used to heat a pool with a first thermal exchange segment disposed underwater and a second thermal exchange segment being a solar thermal collector disposed on a roof.

In a second embodiment, the first thermal exchange segment 26 may be disposed under water 42 rather than underground 40, as in FIGS. 3 and 9. Similar to the first embodiment, the system 10 can utilize the more consistent temperatures of bodies of water 42 versus surface temperatures to help heat or cool an object or an area, although such temperatures are not generally as consistent as underground. Examples of bodies of water 42 can include, but certainly are not limited to, barrels, ponds, lakes, streams, creeks, rivers, and reservoirs. Thereby, the present system 10 could be utilized to heat or cool an object or area based on the time of year and/or desired function.

Cooling

For example, the system 10 of FIG. 3 can be used to provide cooling to an attic by removing heat therefrom. Therein, the first thermal exchange segment 26 is located in a lake while the second thermal exchange segment 28 is located in the attic. In use, as fluid 12 which has already passed through the second thermal exchange segment 28 and absorbed heat is pumped from the second end 18 into the first 16 fluid and is displaced through a portion of the conduit 14 into the first thermal exchange segment 26 to give off the absorbed heat to the water 42. From the first thermal exchange segment 26, fluid 12 is displaced into the second thermal exchange segment 28 to absorb more heat and be pumped again. Although the system 10 is described above as moving fluid from the second end 18 into the first end 16, it is foreseen the system 10 could also move fluid in the opposite direction, from the first end 16 into the second 18.

Heating

In a further example, the system 10 of FIG. 9 could also be utilized to heat water 42 in a swimming pool. Therein, the first thermal exchange segment 26 is in a pool while the second thermal exchange segment 28 is located on the roof of a house in sunlight. In use, fluid 12 absorbs heat generated by solar radiation in the second thermal exchange segment 28 and is displaced to the second end 18 to be pumped to the first end 16 and into the first thermal exchange segment 26. In the first thermal exchange segment 26 fluid gives off its heat to the pool water 42 before returning to the second thermal exchange segment 26 to absorb more heat. Although the system 10 is described above as moving fluid 12 from the second end 18 into the first end 16, it is foreseen the system 10 could also move fluid in the opposite direction, from the first end 16 into the second 18.

Third Embodiment

Figure 10:
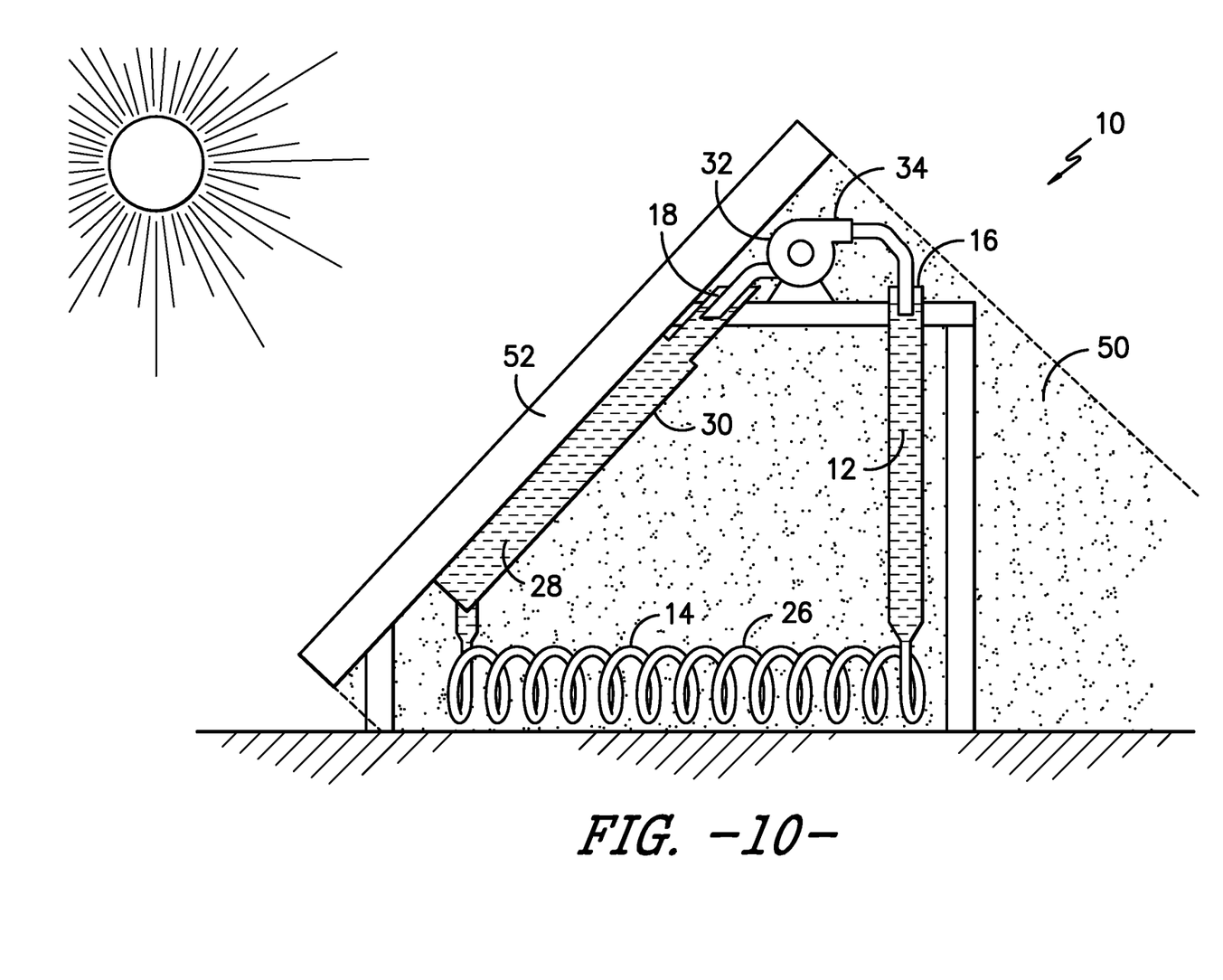
FIG. 10 is an elevation view of a cross section of one embodiment of a heat transfer system being used to cool a solar panel with a first thermal exchange segment disposed in the shade beneath the solar panel and a second thermal exchange segment disposed on the underside of the solar panel.

In a third embodiment, the first thermal exchange segment 26 may be disposed in shade 50 rather than below ground 40 or water 42, as in FIG. 10. Thereby, the system 10 can utilize the lowered temperature of a shaded region to cool an object in the sun. In FIG. 10, the first thermal exchange segment 26 is disposed in the shade 50 below a solar panel 52. In use, fluid 12 absorbs heat from the solar panel 52 in the second thermal exchange segment 28 before being drawn from the second end 18 and pumped to the first end 16. As the fluid 12 is pumped into the first end 16, fluid 12 already in the conduit 14 is displaced into the first thermal exchange segment 26 to give off heat and back into the second thermal exchange segment 28 to absorb more heat from the solar panel 52. Although the system 10 is described above as moving fluid 12 from the second end 18 into the first end 16, it is foreseen the system 10 could also move fluid in the opposite direction, from the first.

Alternative and Additional Elements

Conduit

Generally

The conduit 14 has been described generally in terms of its portions and function within the system 10 as a channel for fluid 12 flow between the various portions of the system 10. However, in greater detail, it is foreseen that the conduit 14 may be composed of any material and into any length, size, shape, and diameter, as long as the two open ends 16, 18 thereof are disposed at a greater vertical height (elevation) than the other portions of the conduit 14 and arranged relative to one another so that the ends 16, 18 act as communicating vessels when fluid 12 is therein. Indeed, the conduit 14 might even have a rectangular, almost flat, cross-section. Further, it is foreseen the desired flow rate of the fluid 12 and the rate at which the means for adding fluid 32 operates will generally influence the diameter of the conduit 14 utilized as the fluid 12 is unpressurized when entering the open ends 16, 18. Also, it is foreseen that the conduit 14 may be partially covered with insulation to prevent the transfer of heat beyond the thermal exchange segments 26, 28. Sections of the insulation may also be adaptable to alter where and how much of the conduit 14 is insulated.

First and Second Ends

Figure 4:
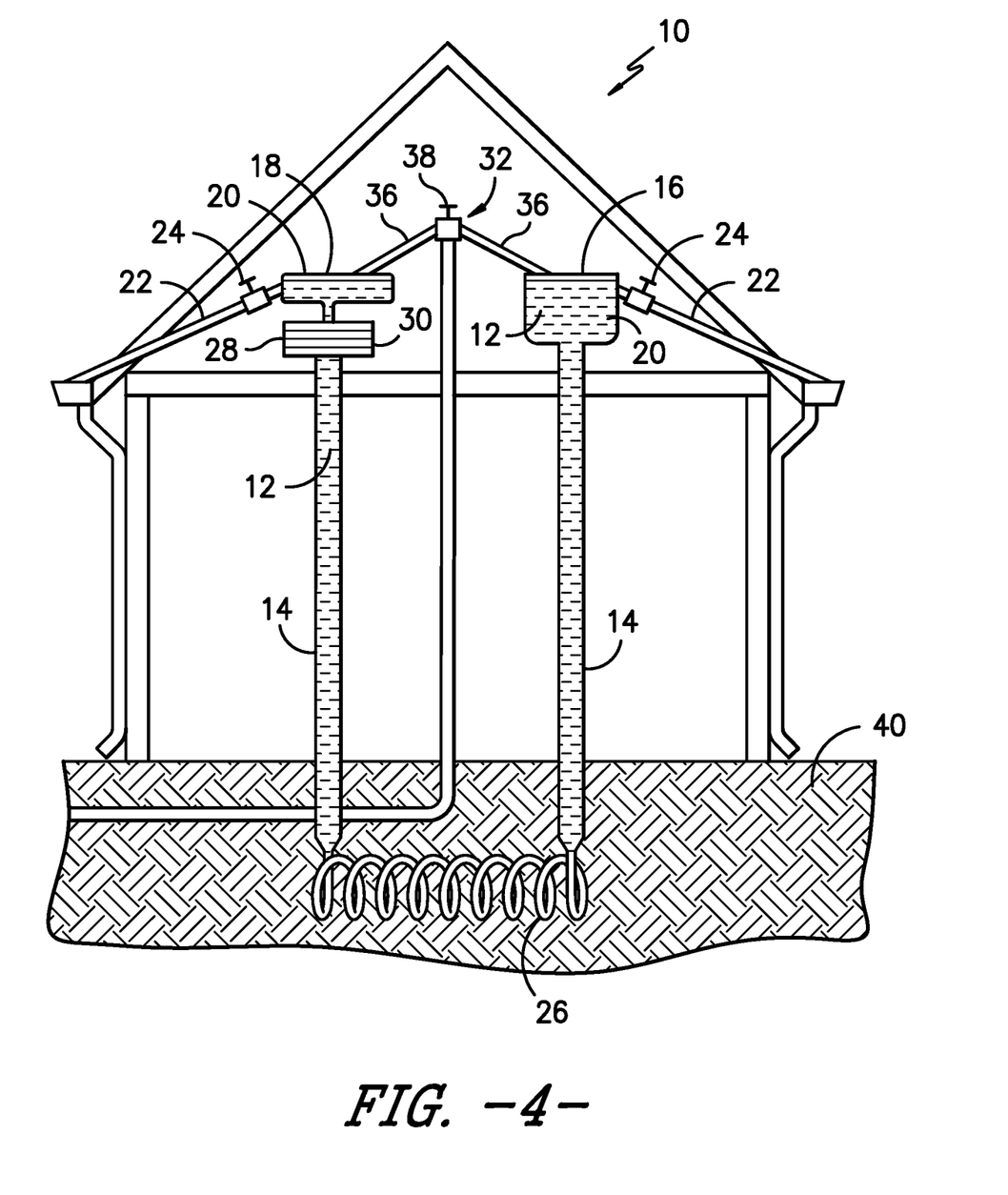
FIG. 4 is an elevation view of a cross section of one embodiment of a heat transfer system being used to cool an attic with reservoirs at the first and second ends and outlet pipes therefrom and an inlet from a continuous water source as opposed to a pump.
Figure 5:
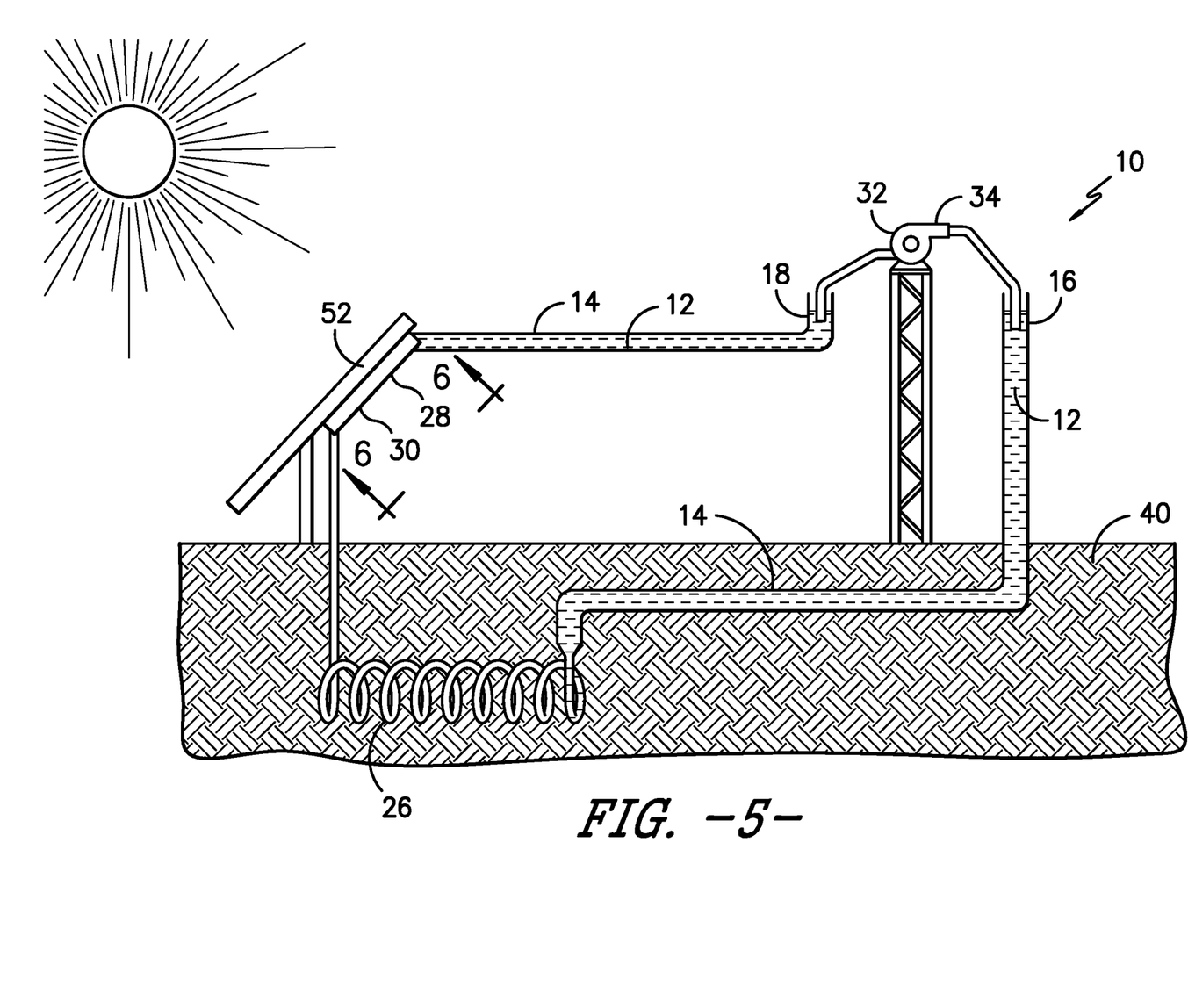
FIG. 5 is an elevation view of a cross section of one embodiment of a heat transfer system being used to cool a solar panel with a first thermal exchange segment below ground and a second exchange segment being a heat exchanger having micro-channels disposed on the back of the solar panel.
Figure 6:
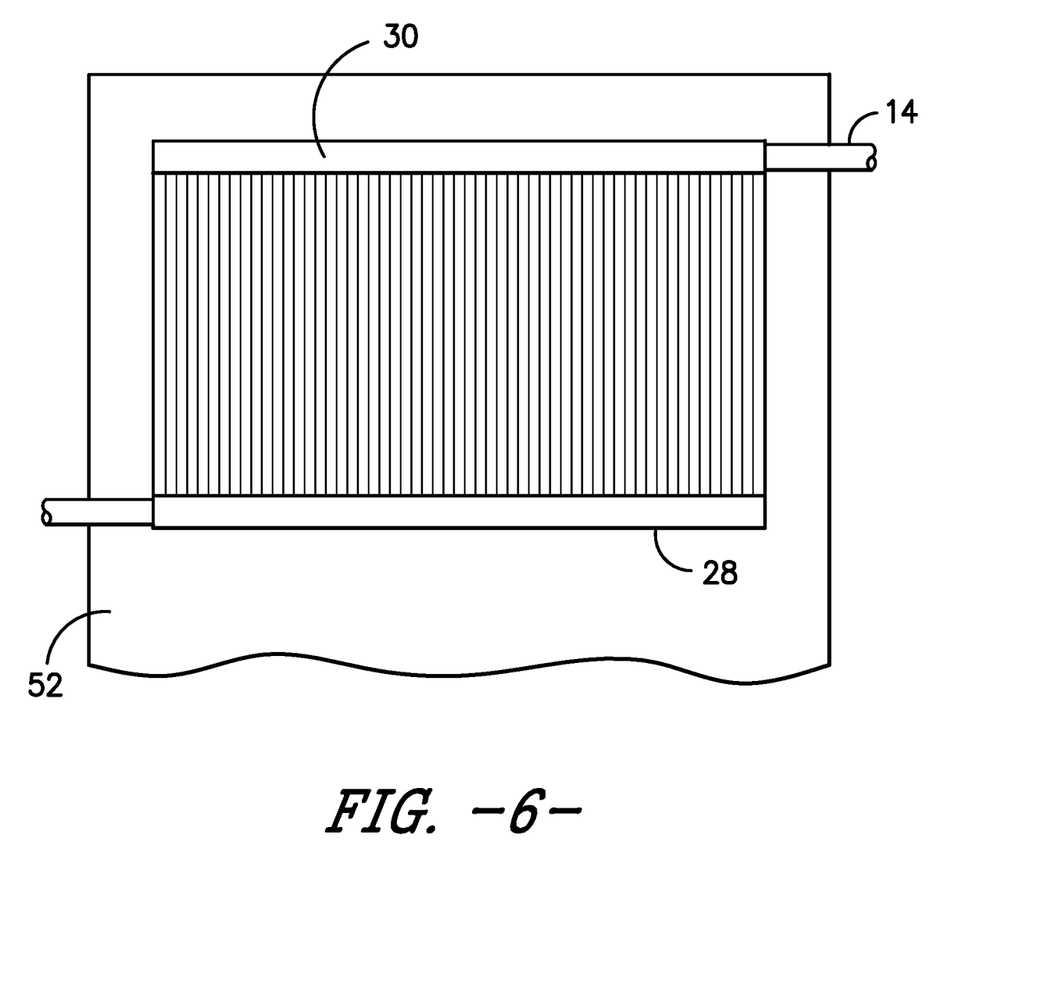
FIG. 6 is an elevation view of the heat exchanger disposed on the back of the solar panel and having micro-channels along line 6-6 in FIG. 5.

Regarding the first end 16 and second end 18, it is foreseen that, beyond just being open ends of the conduit 14, one or both of the ends 16, 18 might also comprise a reservoir 20, as in FIG. 4. Thereby, overflow of fluid 12 from an end 16, 18 of the conduit 14 is less likely, should the means for adding fluid 32 add fluid 12 to one end at a variable rate. In addition or alternatively, the ends 16, 18 might also include an outlet 22 as in FIG. 4. Thereby, any overflow of fluid 12 might be shunted away from the system 10. Alternatively, the system 10 can thereby be run without cycling fluid 12 from one end to another, instead fluid 12 might be added and then exit the system 10 completely, through one or more of the outlets 22. Thereby, in certain embodiments, such as if the means for adding fluid 32 was merely an inlet 36 from a fairly continuous source (like as a natural body of water or municipal water system), fluid 12 could flow through the system 10 and exit the outlet 22, instead of being transferred between opposite ends of the conduit 14, as in FIG. 4. It is foreseen that in such embodiments, the outlet 22 might also have a valve 24, to allow a user to choose between cycling fluid 12 or having it exit the system 10, as in FIG. 4.

Thermal Exchange Segments

Regarding the thermal exchange segments 26, 28, it is foreseen that one or both may be any possible size and shape, just like the conduit 14. Further, it is also foreseen that one or both of these segments 26, 28 might be made of different materials and/or have additional features to enhance thermal transfer. For example, the second thermal exchange segment 28 might include a radiator-like heat exchanger 30 with a structure having a flat cross-section and header and footer portions with linking micro-channels there-between which can fit snug along a rear portion of a solar panel to absorb heat therefrom, as in FIG. 5. Further, the thermal exchange segments 26, 28 might also have fins to increase the surface area in thermal contact with an area or object, such as in FIG. 1. Additionally, it is foreseen that, one or more thermal exchange segment 26, 28 might also be utilized with a fan or blower, particularly in circumstances where the system 10 is being utilized to heat or cool an area, as opposed to a particular object. Thereby, more air or water in an area contacts the thermal exchange segment 26, 28 enhancing thermal transfer.

Means for Adding Fluid

While in the first and second embodiments, a pump 34 is disclosed as the means for adding fluid 32, it is also foreseen that other means may be utilized beyond a pump 34. For example, the means for adding fluid 32 may merely be an inlet 36 from a continuous water (fluid) source (such as a natural spring or municipal water system), as in FIG. 4. Thereby, water 12 may be continuously fed into the system 10, removing the need for a pump 34. In such an embodiment, it is preferable for one end to be adapted with an outlet 22 to remove water from the system 10, as in FIG. 4. For example, if an inlet 36 is supplying water 12 into the first end 16, the second end 18 should have some kind of outlet 22 to remove the water 12. Otherwise, water 12 may overflow one or both the first end 16 and second end 18, depending upon their arrangement relative to one another. Further, it would be wise in such circumstances to also have an outlet 22 at the first end 16 to ensure that any possible overflow of the first end 16 is also planned for as in FIG. 4.

It is also foreseen that an inlet 36 might also include a valve 38 to allow the flow of water 12 to be stopped or to be switched between the first end 16 and second end 18, should it be desired or necessary. Such a valve 38 may also provide variability if combined with a pump 34 to allow the system 10 to run with either a pump 34 or inlet 36 from a continuous source. Further, it is also foreseen that the pump 34 may be solar powered, further reducing the energy requirements of the system 10. Please also note that, though the pump 34 is shown on an elevated stand in FIGS. 1-3, 5, 7, and 8, the pump 34 may be located almost anywhere. For example, in FIG. 10, the pump 34 is shown as mounted to the solar panel 52 support structure. Locating the pump close to the first and second ends 16, 18 is preferable because it reduces the distance fluid 12 has to be pumped and makes the system 10 more compact.

Fluid

While in the earlier embodiments the fluid 12 is discussed in general or specified as water, it is foreseen that the fluid 12 may be one of almost any number of other compositions. For example, the fluid 12 may include glycol corn oil, vegetable oil, mineral oil, or the like. In fact, any fluid 12 with which doesn't vaporize or completely solidify within the operating temperatures of the system 10 might be utilized if it can provide a desired efficient flow and transfer of heat in a particular use of the system 10.

However, determination of the best fluid 12 may be based on operation of the system 10 itself. For example, if a continuous water source is available, water might be the best choice, thereby allowing the system 10 to utilize the source as in FIG. 4. Otherwise, the system 10 might be limited to utilizing a pump 34 to move fluid 12 from one end to another as in FIG. 1. In such limited operation, the system 10 might utilize a fluid 12 specified above or one in which particular solids, like salt, are dissolved to prevent freezing and/or enhance thermal transfer.

Condensed Moisture Collector

The present system 10, in certain embodiments, may further include a condensed moisture collector 44 which captures moisture which may condense on outside portions of the conduit 14. For example, condensed moisture forming on the outside of the conduit 14 may be captured by a container as it falls therefrom. Alternatively, condensed moisture may be collected by any receptacle, vessel, canister, can, box, holder, repository, or other structure sufficient to collect water. Further, in a preferred embodiment, the system 10 may further include a flat plate, or condensation plate 48, in thermal contact with one or more portions of the conduit 14, including the second thermal exchange segment 28, and upon which condensation may form to be collected by the moisture collector 44, as in FIG. 7. Further, as an aid to operation, it is foreseen that either the condensation plate 48 or a portion of the conduit 14 itself, might have a hydrophobic outer surface to overcome surface tension of moisture formed on their surfaces, enhancing runoff of the moisture and facilitating easier cleaning, as may be required.

In use, condensed moisture may form on an outside portion of the present system 10, either the conduit 14 itself or a condensation plate 48, due to the differences in temperatures between that portion and the surroundings. As such moisture forms, water vapor is removed from the air, and humidity is reduced in the surrounding area. The condensed moisture may fall or flow from the outside portion of the system 10 into a condensed moisture collector 44. Such condensed moisture collector 44 may also remove such collected moisture from the surroundings, such as by being connected to a drainage system, to prevent the moisture from evaporating and increasing the humidity of the surroundings again. Such a condensed moisture collector 44 may be useful where the present system 10 is utilized in areas in which increased humidity or wetness may not be desired or may cause damage.

Purification Mechanism

Figure 7:
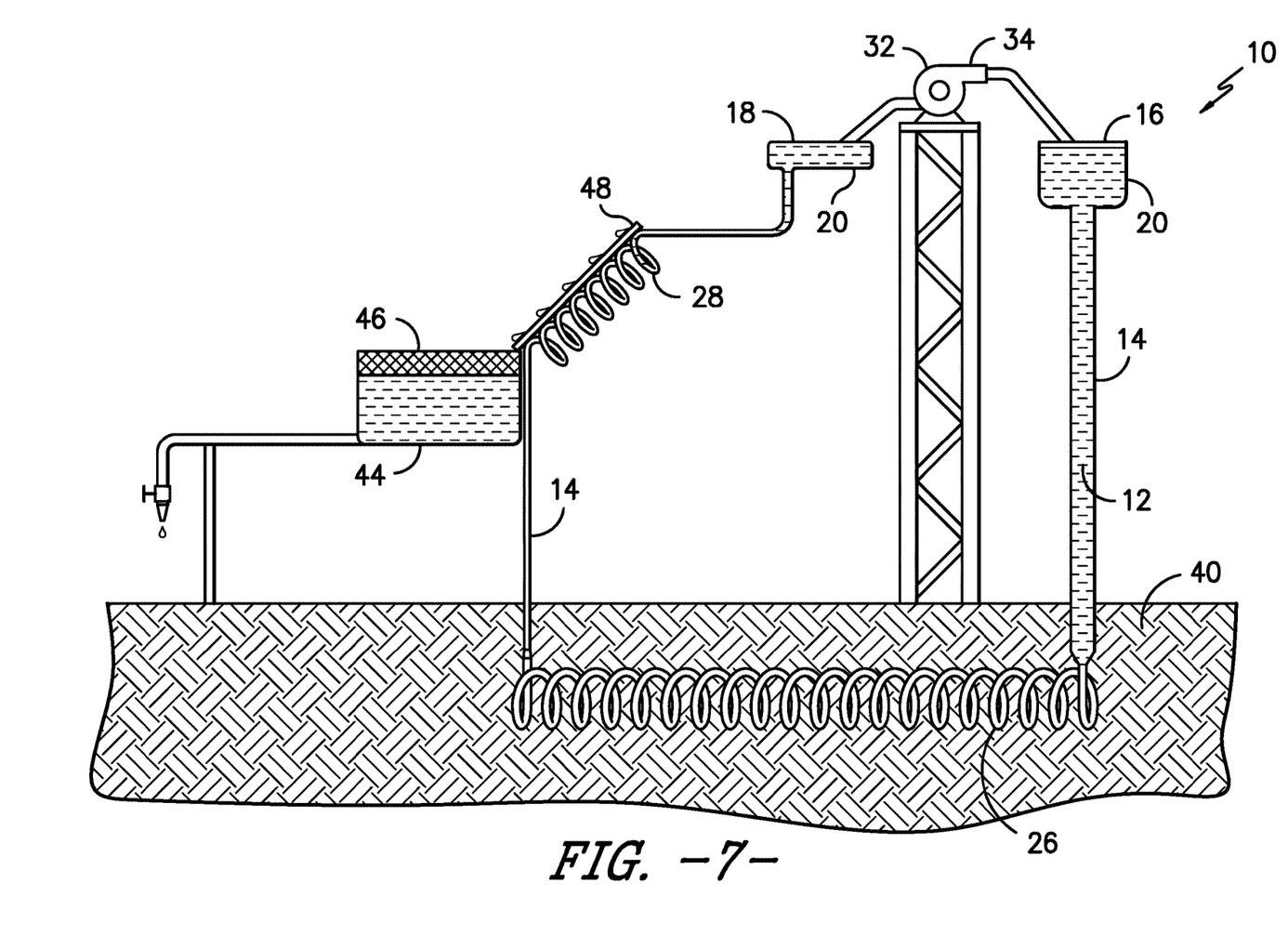
FIG. 7 is an elevation view of a cross section of one embodiment of a heat transfer system having reservoirs at the first and second ends, a first heat exchange segment below ground, and including a condensation plate in thermal contact with the second thermal exchange segment and a condensed moisture collector and purification mechanism.

In addition to the above condensed moisture collector 44, it is also foreseen that certain embodiments of the system 10 may also employ a purification mechanism 46 to purify the condensed moisture for consumption or use, as in FIG. 7. For example, condensed moisture may be purified by passing it through a filter, such as a drip filter with activated charcoal and baking soda. However, the purification mechanism 46 may be any device or method which removes or neutralizes impurities to produce useful water. For example, the purification mechanism 46 may involve sedimentation, ultraviolet light, the use of chemicals (chlorine, bromine, iodine, hydrogen peroxide, silver, etc.), filtration through mediums or membranes, or oxidation.

Alternative Uses and/or Combinations

Furthermore, it is foreseen that the foregoing features, elements, and setups might be interchanged and combined in a particular system 10. For example, a system 10 might have more than one first thermal exchange segments 26 or second thermal exchange segments 28, in series or in parallel. Additionally, it is foreseen that the system 10 might also have one or more valves to control the flow of fluid 12 through any additional segments 26, 28, particularly if such segments are installed in parallel. Thereby, the system 10 might be variable for enhanced operation or to allow for additional uses.

Although the present invention has been described in considerable detail with possible reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features. Further, it is not necessary for all embodiments of the invention to have all the advantages of the invention or fulfill all the purposes of the invention.

In the present description, the claims below, and in the accompanying drawings, reference is made to particular features (including method steps) of the invention. It is to be understood that the disclosure of the invention in this specification includes all possible combinations of such particular features. For example, where a particular feature is disclosed in the context of a claim, that feature can also be employed, to the extent possible, in aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

What is claimed is:

1. A heat transfer system comprising:
   a conduit through which a fluid may flow comprising an open first end and a second open end in fluid communication having a first and second thermal exchange segment disposed there-between, and wherein said open first end and said open second end are positioned and oriented to be generally level in a single horizontal plane;
   said first segment being disposed underground;
   said second segment being disposed above-ground;
   said open first end and open second end being located at a height above the other portions of conduit and arranged such that said first and second open ends are communicating vessels so a change in fluid level in said first end moves fluid within said conduit and changes fluid level in said second end; and
   a means for adding unpressurized fluid to one end displaces fluid toward the other end, thereby overcoming hydrostatic pressure in said system without a pump disposed along said conduit.

2. The heat transfer system of claim 1, wherein said second thermal exchange segment transfers heat from ambient atmosphere to fluid therein.

3. The heat transfer system of claim 1, wherein said first thermal exchange segment transfers heat underground from fluid therein.

4. The heat transfer system of claim 1, wherein said means for adding fluid to one end removes fluid from the other end.

5. The heat transfer system of claim 1, wherein said means for adding fluid to one end comprises a pump.

6. The heat transfer system of claim 1, wherein at least one of said first thermal exchange segment and second thermal exchange segment comprises a heat exchanger that increases surface area for thermal exchange.

7. The heat transfer system of claim 1, further comprising insulation disposed along at least a portion of said conduit.

8. The heat transfer system of claim 1, wherein at least one of said first end and second end comprises a reservoir.

9. The heat transfer system of claim 1, further comprising a condensation plate in thermal communication with said second thermal exchange segment and whereupon condensation forms.

10. The heat transfer system of claim 9, further comprising a condensed moisture collector to collect moisture formed on said condensation plate.

11. The heat transfer system of claim 10, further comprising a purification mechanism for receiving and purifying said condensed moisture collected from said plate.

12. The heat transfer system of claim 1, further comprising a condensed moisture collector to collect moisture formed on said conduit.

13. The heat transfer system of claim 12, further comprising a purification mechanism for receiving and purifying said condensed moisture collected from said conduit.

* * * * *